United States Patent
Kuzma et al.

(10) Patent No.: US 11,332,401 B2
(45) Date of Patent: May 17, 2022

(54) METHOD OF PRODUCING BIOCHAR FROM SLUDGE

(71) Applicant: Anaergia Inc., Burlington (CA)

(72) Inventors: Matthew John Kuzma, Encinitas, CA (US); Juan Carlos Josse, Aliso Viejo, CA (US)

(73) Assignee: ANAERGIA INC., Burlington (CA)

( * ) Notice: Subject to any disclaimer, the term of this patent is extended or adjusted under 35 U.S.C. 154(b) by 488 days.

(21) Appl. No.: 16/098,949

(22) PCT Filed: May 16, 2017

(86) PCT No.: PCT/CA2017/050583
§ 371 (c)(1),
(2) Date: Nov. 5, 2018

(87) PCT Pub. No.: WO2017/197508
PCT Pub. Date: Nov. 23, 2017

(65) Prior Publication Data
US 2019/0084859 A1 Mar. 21, 2019

Related U.S. Application Data
(60) Provisional application No. 62/337,583, filed on May 17, 2016.

(51) Int. Cl.
*C02F 11/10* (2006.01)
*C05B 17/00* (2006.01)
(Continued)

(52) U.S. Cl.
CPC .......... *C02F 11/10* (2013.01); *C02F 3/2893* (2013.01); *C02F 11/143* (2019.01); *C05B 7/00* (2013.01);
(Continued)

(58) Field of Classification Search
CPC ...................................................... C02F 11/10
See application file for complete search history.

(56) References Cited

U.S. PATENT DOCUMENTS

2003/0196969 A1* 10/2003 Anderson ................ C02F 9/00
210/768
2008/0264857 A1* 10/2008 Sieczkowski ............. B09C 1/10
210/611
(Continued)

FOREIGN PATENT DOCUMENTS

| CA | 2859599 A1 | 7/2012 |
| CA | 2862132 A1 | 8/2013 |

(Continued)

OTHER PUBLICATIONS

International Patent Application No. PCT/CA2017/050583, International Preliminary Report on Patentability dated Nov. 29, 2018.
(Continued)

*Primary Examiner* — Peter Keyworth
(74) *Attorney, Agent, or Firm* — Borden Ladner Gervais LLP; Michael J. Damiani

(57) ABSTRACT

The specification describes a system and process for treating a sludge or slurry to produce biochar. The sludge or in slurry may be digestate produced by an anaerobic digester that receives waste activated sludge from a wastewater treatment plant. In a process, digestate is dosed with metal ions, dewatered, and pyrolized. A corresponding system includes a reactor, a dewatering unit and a pyrolysis unit. In an example, the digestate is air stripped in the reactor and a metal salt is added to it. The metal ions form precipitates in the digestate that remain in the biochar. In some cases, a precipitate such as struvite is formed that also increases the phosphorous content of the biochar. The biochar may be
(Continued)

used as a soil amendment, wherein the metal and phosphorous are beneficial to the soil.

10 Claims, 1 Drawing Sheet

(51) Int. Cl.
*C05F 11/00* (2006.01)
*C05B 7/00* (2006.01)
*C05F 17/40* (2020.01)
*C05F 17/50* (2020.01)
*C02F 11/143* (2019.01)
*C02F 3/28* (2006.01)
*C02F 1/52* (2006.01)

(52) U.S. Cl.
CPC .............. *C05B 17/00* (2013.01); *C05F 11/00* (2013.01); *C05F 17/40* (2020.01); *C05F 17/50* (2020.01); *C02F 1/5245* (2013.01); *Y02P 20/145* (2015.11); *Y02W 10/40* (2015.05); *Y02W 30/40* (2015.05)

(56) References Cited

U.S. PATENT DOCUMENTS

| | | | | |
|---|---|---|---|---|
| 2013/0134089 | A1* | 5/2013 | Cote | ......................... C02F 3/30 210/605 |
| 2015/0329399 | A1* | 11/2015 | Kumar | ..................... C01C 1/10 71/10 |

FOREIGN PATENT DOCUMENTS

| | | |
|---|---|---|
| JP | 2006026542 A | 2/2006 |
| WO | 2006074643 A2 | 7/2006 |
| WO | 2013126477 A1 | 8/2013 |

OTHER PUBLICATIONS

International Patent Application No. PCT/CA2017/050583, International Search Report and Written Opinion dated Aug. 21, 2017.

* cited by examiner

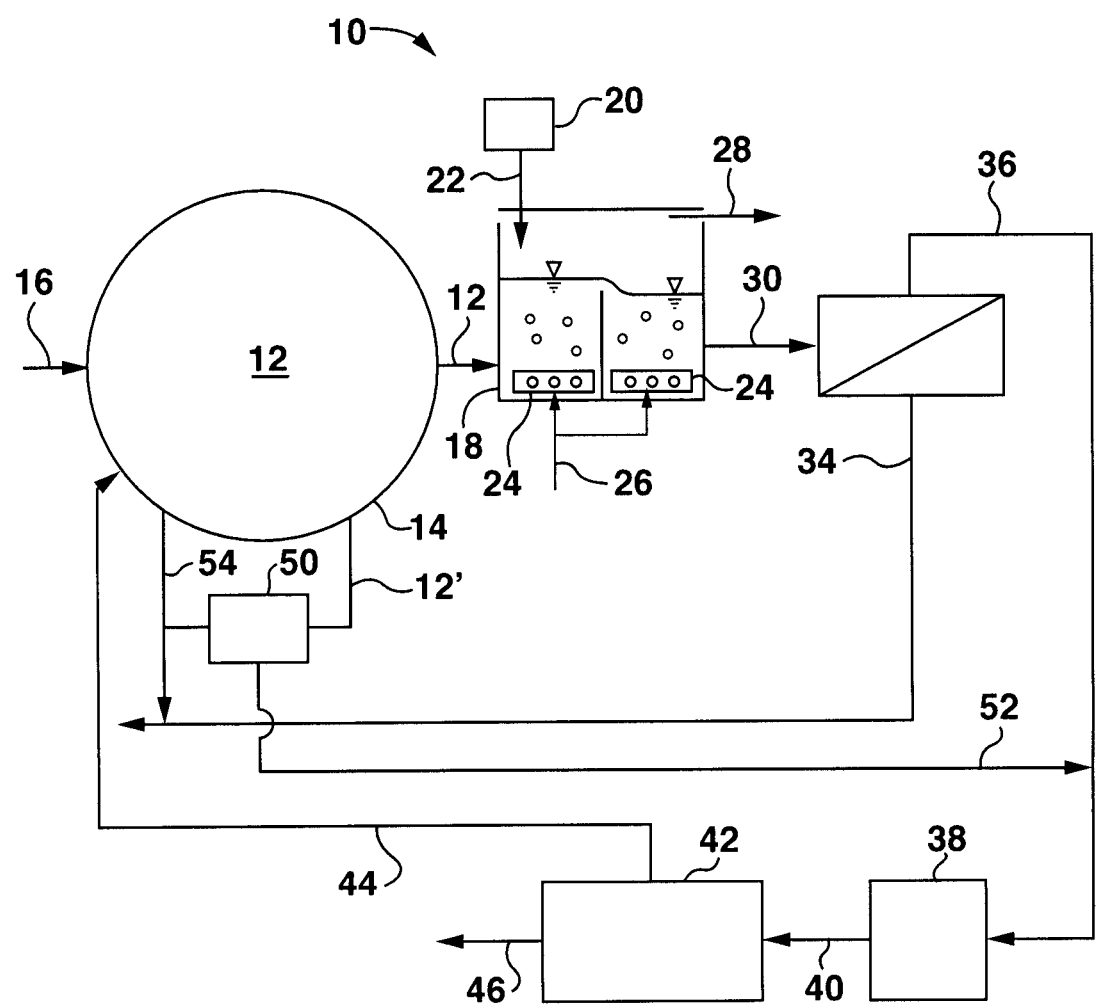

METHOD OF PRODUCING BIOCHAR FROM SLUDGE

CROSS-REFERENCE TO RELATED APPLICATIONS

This application is a national stage entry of International Application No. PCT/CA2017/050583, filed May 16, 2017, which claims the benefit of U.S. Application Serial No. 62/337,583, filed May 17, 2016, which is incorporated herein by reference.

FIELD

This specification relates to sludge treatment and to biochar production.

BACKGROUND

U.S. Pat. No. 8,877,468, Method for Converting Biomass to Methane or Ethanol, describes a process wherein lignocellulose-containing materials are subjected to pyrolysis. A portion of these materials is converted into compounds amenable to anaerobic digestion. The pyrolysis also produces biochar. The lignocellulose-containing materials may be wastewater treatment sludge.

INTRODUCTION

The specification describes a system and process useful, for example, for treating anaerobic digester sludge (digestate) to produce biochar. Optionally, the system and process may be used to treat digestate produced by an anaerobic digester that receives feed material containing phosphorous. In particular, waste activated sludge (WAS) from a wastewater treatment plant (WWTP) frequently contains a material concentration of phosphate, which remains in the digestate.

In a process described herein, digestate is dosed with metal cations, dewatered, optionally dried, and pyrolized. The pyrolysis produces biochar. Optionally, a metal salt is added to the digestate to provide the metal ions. The pH of the digestate may also be increased before it is dewatered. In an example, the digestate is air stripped, which causes both a pH increase by removing carbon dioxide and, with further air stripping, recovers ammonia from the digestate. The metal ions form precipitates in the digestate that remain in the biochar. The precipitates may be one or more of struvite, hydroxyapatite, brushite, or another compound. In some cases, the precipitate is also increases the phosphorous content of the biochar.

A system described in this specification includes a reactor, a dewatering unit, optionally a dryer, and a pyrolysis unit. The reactor includes a chemical feeder and mixer. Optionally, the reactor includes an aerator. The aerator may function as the mixer and may also provide air stripping in the reactor.

By way of the system and process described above, biochar is produced having precipitates containing phosphorous, one or more metals, or both. The biochar may be used, for example, as a soil amendment. Phosphorous is a beneficial soil nutrient. Metals in biochar, in particular magnesium, calcium, iron and potassium, can beneficially improve the adsorption capacity or cation exchange capacity (CEC) of soils. Stripping carbon dioxide and/or ammonia from digestate, for example by heating the digestate and blowing air through and/or over it, and adding a metal such as magnesium to the digestate makes the digestate easier to dewater.

BRIEF DESCRIPTION OF THE FIGURE

FIG. 1 is a schematic process flow diagram of a sludge treatment and biochar production system.

DETAILED DESCRIPTION

FIG. 1 shows a system 10. The system 10 may be described as a sludge treatment system or a biochar production system. In this example, the system 10 receives digestate 12 from an anaerobic digester 14. The digester 14 receives sewage sludge 16 from a wastewater treatment plant. Sludge 16 may include waste activated sludge (WAS), optionally mixed with another form of sludge or other organic waste. In other examples, the digester 14 might receive a different feedstock. Optionally, the system 10 may be used to treat WAS or another sludge or slurry directly. However, since the volatile fraction of WAS or other feedstocks can be converted into useful biogas, it is preferable to first digest the WAS.

The digestate 12 flows into a reactor 18. Reactor 18 may be a tank or other vessel that provides residence time and mixing while the digestate 12 flows through it. Optionally, the reactor 18 may be divided internally into multiple stages to inhibit channeling, or to help separate phases of a reaction, or both. Stages can be provided, for example, by providing baffles or walls (with appropriate weirs, holes or other passages) within a tank or by providing multiple vessels linked by pipes, overflows or channels.

Reactor 18 has a chemical feeder 20 that introduces one or more chemicals 22 into the digestate 12. The chemicals 22 include metal ions, for example in the form of a metal salt. In particular, the chemicals 22 may include a salt of one or more of magnesium, calcium, potassium or iron. Optionally, the chemicals 22 may include other compounds such as caustic, lime or magnesium hydroxide. These other compounds can be added to raise the pH of the digestate 12, or encourage precipitation of compounds containing the metal ions, or both.

Reactor 18 may also have a diffuser 24 or other means by which a gas such as air 26 is added to the reactor 18 to form bubbles in the digestate 12. Optionally or additionally, a flow of air can be provided across the surface of the digestate 12 in reactor 18. The bubbles can provide mixing in the reactor 18. Alternatively, the reactor 18 may be mixed with paddles or another mechanical device. The bubbles also strip exhaust gasses 28 from the digestate 12. The exhaust gasses 28 can include carbon dioxide and ammonia. Removing carbon dioxide raises the pH of the digestate, which encourages formation of some metal precipitates and reduces or eliminates the need for adding chemical agents to increase pH. Increased pH also encourages release of ammonia gas from the digetate 12. Optionally, the ammonia gas can be recovered to produce, for example, ammonium sulfate, ammonium hydroxide or ammonium phosphate, which can be used to make fertilizer or other things. The digestate 12 in reactor 18 can be heated, for example to a temperature in the range of 50 to 70 degrees C., to encourage the release of carbon dioxide and ammonia.

Metal cations in the chemicals 22 react with other compounds in the digestate 12 to form one or more precipitates. The resulting reacted digestate 30 contains these precipitates, for example in suspension. In the example of FIG. 1, sludge 16 is made up partially or entirely of WAS. The WAS contains ortho-phosphate ($PO_4$—P). The chemicals 22 include magnesium chloride ($MgCl_2$). The digestate 12 in reactor 18 is preferably maintained at a pH of 7.5 or more or 8.5 or more. The exhaust gasses 28 include ammonia but some ammonium ions remain in the digestate 12. The magnesium ions react with ammonium, hydrogen phosphate and water to produce struvite ($MgNH_4PO_4*6H_2O$), also called magnesium ammonium phosphate (MAP). The resulting reacted digestate 30 contains struvite and has reduced concentrations of ammonia and ortho-phosphate. Components downstream of reactor 18 are incidentally protected from uncontrolled struvite scaling. Other precipitates that can be formed include, for example, hydroxyapatite and brushite.

Alternatively, chemicals 22 can be added to the digestate 12 within the digester 14 or anywhere upstream of dewatering unit 32, for example through an inline or other mixer. In this case, the digester 14 or mixer performs one of the functions of reactor 18. Reactor 18 can be omitted or used for one or more of carbon dioxide stripping, pH adjustment or ammonia stripping.

The reacted digestate 30 flows to a dewatering unit 32. The dewatering unit 32 separates the reacted digestate 30 into a liquid fraction 34 and cake 36. The reduced concentration of ortho-phosphate (or other forms of soluble phosphorous) in the reacted digestate 30 resulting from phosphorous precipitation makes the reacted digestate 30 easier to dewater or increases the solids concentration of the cake 36. At least some, preferably 50% or more or 80% or more, of the metal-containing precipitates in the reacted digestate 30 are retained in the cake 36. In the example of FIG. 1, the cake 36 contains struvite.

Cake 36 optionally passes through a dryer 38 to produce dried cake 40. Dried cake 40, or optionally cake 36 directly, is then fed into pyrolysis unit 42. Pyrolysis unit 42 heats the dried cake 40 (or cake 36) in the absence of oxygen. The pyrolysis unit 42 produces a pyrolysis fluid 44 and biochar 46. Some (for example a condensable liquid fraction) or all of pyrolysis fluid 44 is returned to digester 14 to increase production of biogas 48.

The temperature in the pyrolysis unit 42 is preferably in the range of 250-400 degrees C., or 300-375 degrees C. This generally low temperature produces a minimal amount of compounds that are toxic or inhibitory to methanogens in the pyrolysis fluid 44. Alternatively, a higher pyrolysis temperature may be used to increase the quality of biochar 46. In this case, some other use can be made of pyrolysis fluid 44, or toxins (such as long chain hydrocarbon oils) can be separated from pyrolysis fluid 44 before returning it to digester 12. In another option, biochar 46 produced at a low temperature can be re-pyrolysed at a higher temperature.

Because of the addition of metal ions in the digestate 12, biochar 46 includes metal precipitates and optionally phosphorous. In the example of FIG. 1, magnesium and phosphorous are both present in the biochar 46 in the form of struvite. The biochar 46 can be used as a soil amendment. Cations, for example as provided in metal precipitates, in biochar 46 help improve the adsorption capacity and/or cation exchange capacity (CEC) of the biochar 46 and of soil containing the biochar 46. Phosphorous is a valuable nutrient in the soil.

Optionally, the phosphorous concentration in biochar 46 can be further increased with precipitants taken from the digestate 12. A second stream of digestate 12' is removed from digestate 12 or taken from digester 14 directly as shown. The second stream of digestate 12' is sent to a hydrocyclone 50 or other means of removing grit or other dense solids. The grit contains precipitants already formed in the digester 14. Hydrocyclone 50 produces degritted digestate 54 which can be treated by one or more of returning to the digester 14, blending with liquid fraction 34 (which might be returning to a wastewater treatment plant or to digester 14), blending with digestate 12 flowing to reactor 18, or stripped of carbon dioxide and/or ammonia in another reactor. Hydrocyclone 50 also produces a grit-containing stream 52 that is added to cake 36, thereby increasing the metal and/or phosphorous concentration of cake 36.

We claim:

1. A process for treating digestate comprising the steps of,
   dosing the digestate with metal cations in an amount sufficient to produce a precipitate including the metal cations in the digestate;
   dewatering the dosed digestate to form a cake such that at least some of the precipitate is retained in the cake;
   pyrolizing the cake to produce biochar; and,
   removing grit and/or dense solids from a second digestate and treating the second digestate by one or more of the following: 1) returning at least a portion of the second digestate to an anaerobic digester; 2) blending at least a portion of the second digestate with liquid produced from the dewatering step; and 3) blending at least a portion of the second digestate with the digestate.

2. The process of claim 1 wherein a metal salt is added to the digestate.

3. The process of claim 1 wherein the pH of the digestate is increased before it is dewatered.

4. The process of claim 1 wherein the digestate is air stripped before it is dewatered.

5. The process of claim 1 wherein magnesium is added to the digestate and the precipitate is struvite.

6. The process of claim 1 wherein the digestate is produced by anaerobic digestion of a feedstock that includes sewage sludge.

7. The process of claim 6 wherein the sludge is waste activated sludge.

8. The process of claim 1 further comprising aerating the digestate before it is dewatered.

9. The process of claim 1 further comprising carbon dioxide stripping and/or ammonia stripping the digestate before it is dewatered.

10. the process of claim 1 further comprising adding the removed grit to the cake.

* * * * *